United States Patent
Eo et al.

(10) Patent No.: US 9,780,891 B2
(45) Date of Patent: Oct. 3, 2017

(54) METHOD AND DEVICE FOR CALIBRATING IQ IMBALANCE AND DC OFFSET OF RF TRANCEIVER

(71) Applicant: ELECTRONICS AND TELECOMMUNICATIONS RESEARCH INSTITUTE, Daejeon (KR)

(72) Inventors: Ik Soo Eo, Daejeon (KR); Sang-Kyun Kim, Daejeon (KR); Cheon Soo Kim, Daejeon (KR); Jang Hong Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/229,950

(22) Filed: Aug. 5, 2016

(65) Prior Publication Data
US 2017/0257176 A1    Sep. 7, 2017

(30) Foreign Application Priority Data

Mar. 3, 2016  (KR) .................. 10-2016-0025738
Jul. 29, 2016  (KR) .................. 10-2016-0096630

(51) Int. Cl.
  *H04B 1/38*   (2015.01)
  *H04L 5/16*   (2006.01)
  *H04B 17/14*  (2015.01)
  *H04L 1/24*   (2006.01)

(52) U.S. Cl.
  CPC ............. *H04B 17/14* (2015.01); *H04L 1/243* (2013.01)

(58) Field of Classification Search
  CPC ..... H04L 1/243; H04L 1/0001; H04L 1/0009; H04L 1/1854; G01R 31/31716
  USPC .................................................. 375/219–223
  See application file for complete search history.

(56) References Cited

U.S. PATENT DOCUMENTS

| 6,069,669 | A  | * | 5/2000 | Park ......................... G09G 5/14 345/536 |
| 6,907,074 | B2 | * | 6/2005 | Park ....................... H04N 5/145 348/699 |
| 7,394,882 | B2 | * | 7/2008 | Lee ....................... H04L 7/0334 375/316 |
| 7,962,113 | B2 |   | 6/2011 | Gao et al. |
| 8,027,376 | B2 |   | 9/2011 | Yamanaka et al. |
| 8,102,293 | B2 | * | 1/2012 | Kim ....................... H03M 1/12 341/118 |

(Continued)

FOREIGN PATENT DOCUMENTS

| KR | 10-2008-0025691 A | 3/2008 |
| KR | 10-2009-0021374 A | 3/2009 |

(Continued)

*Primary Examiner* — James M Perez
(74) *Attorney, Agent, or Firm* — Rabin & Berdo, P.C.

(57) ABSTRACT

A method and device for calibrating a DC offset and an I-Q imbalance component of an RF transceiver, the method including inputting a test signal into a transmitter, and converting the test signal into an analogue test signal; converting the analogue test signal using a transmitting mixer; sub-sampling a signal output from the transmitting mixer; and computing a DC offset calibrating constant number and an I-Q imbalance calibrating constant number from a sub-sampled signal.

10 Claims, 9 Drawing Sheets

(56) References Cited

U.S. PATENT DOCUMENTS

| | | | | |
|---|---|---|---|---|
| 8,175,274 B2* | 5/2012 | Lee | G01S 13/0209 | 380/263 |
| 8,204,133 B2* | 6/2012 | Cho | H04N 13/0282 | 348/207.1 |
| 8,284,824 B1* | 10/2012 | Smaini | H04B 1/30 | 341/118 |
| 8,295,405 B2 | 10/2012 | Yu et al. | | |
| 8,341,161 B2* | 12/2012 | Seo | G06F 17/30247 | 707/741 |
| 8,451,901 B2* | 5/2013 | Lee | H04N 19/51 | 375/240.16 |
| 8,462,884 B2* | 6/2013 | Kim | H04B 1/0085 | 375/316 |
| 8,509,353 B2* | 8/2013 | Han | H04B 1/0025 | 341/143 |
| 8,532,238 B2* | 9/2013 | Han | H04B 1/10 | 375/346 |
| 8,532,409 B2* | 9/2013 | Lee | H04N 19/57 | 382/107 |
| 8,577,324 B2* | 11/2013 | Kim | H04B 1/005 | 375/260 |
| 8,675,715 B2* | 3/2014 | Kyeong | H01Q 1/2258 | 343/869 |
| 8,737,554 B2* | 5/2014 | Kim | G01S 7/2921 | 375/371 |
| 8,817,920 B2 | 8/2014 | Son et al. | | |
| 8,855,210 B2* | 10/2014 | Cho | H04N 13/0282 | 345/629 |
| 8,957,800 B2* | 2/2015 | Lee | H03M 7/3062 | 341/155 |
| 9,209,844 B2* | 12/2015 | Han | H04B 1/06 | |
| 9,232,505 B2* | 1/2016 | Oh | H04W 72/0406 | |
| 9,288,090 B2* | 3/2016 | Jung | H04L 27/0006 | |
| 9,294,135 B2* | 3/2016 | Eo | H04B 1/0021 | |
| 9,363,533 B2* | 6/2016 | Lim | H04N 19/597 | |
| 9,438,927 B2* | 9/2016 | Park | H04N 19/52 | |
| 9,571,841 B2* | 2/2017 | Lim | H04N 19/176 | |
| 9,641,361 B2* | 5/2017 | Seo | H04L 25/08 | |
| 9,654,272 B2* | 5/2017 | Nam | H04L 5/0057 | |
| 2008/0226072 A1* | 9/2008 | Lee | G01S 13/0209 | 380/263 |
| 2009/0122194 A1* | 5/2009 | Jung | G06T 3/4007 | 348/581 |
| 2010/0093301 A1* | 4/2010 | Lee | H04B 1/28 | 455/313 |
| 2010/0118961 A1* | 5/2010 | Lee | H04N 19/51 | 375/240.16 |
| 2010/0119109 A1* | 5/2010 | Kim | G06T 7/246 | 382/103 |
| 2010/0135446 A1* | 6/2010 | Han | H04B 1/0025 | 375/350 |
| 2010/0156690 A1* | 6/2010 | Kim | H03M 1/12 | 341/155 |
| 2010/0268715 A1* | 10/2010 | Seo | G06F 17/30247 | 707/741 |
| 2010/0322361 A1* | 12/2010 | Han | H04B 1/0025 | 375/345 |
| 2010/0330949 A1* | 12/2010 | Kim | H04B 1/24 | 455/339 |
| 2011/0051869 A1* | 3/2011 | Kim | H04B 1/28 | 375/350 |
| 2011/0194657 A1* | 8/2011 | Han | H04B 1/10 | 375/350 |
| 2011/0194658 A1* | 8/2011 | Han | H04B 1/10 | 375/350 |
| 2011/0249769 A1* | 10/2011 | Kang | H04L 25/03038 | 375/296 |
| 2012/0039417 A1* | 2/2012 | Kim | H04B 1/001 | 375/316 |
| 2012/0062698 A1* | 3/2012 | Lee | H04N 13/0059 | 348/43 |
| 2012/0128261 A1* | 5/2012 | Lee | H04N 19/57 | 382/236 |
| 2012/0147962 A1* | 6/2012 | Kim | H04N 19/56 | 375/240.16 |
| 2012/0148002 A1* | 6/2012 | Kim | G01S 7/2921 | 375/371 |
| 2012/0224623 A1* | 9/2012 | Cho | H04N 13/0282 | 375/240.2 |
| 2013/0128954 A1* | 5/2013 | Kim | H04N 19/00266 | 375/240.02 |
| 2013/0178179 A1* | 7/2013 | Han | H04B 1/0014 | 455/130 |
| 2013/0182779 A1* | 7/2013 | Lim | H04N 19/597 | 375/240.29 |
| 2013/0243088 A1* | 9/2013 | Lim | H04N 19/52 | 375/240.12 |
| 2013/0250051 A1* | 9/2013 | Lee | H04N 13/0048 | 348/42 |
| 2013/0251043 A1* | 9/2013 | Lee | H04N 19/51 | 375/240.16 |
| 2014/0006564 A1* | 1/2014 | Thang | H04L 65/601 | 709/219 |
| 2014/0016653 A1* | 1/2014 | Oh | H04W 56/001 | 370/474 |
| 2014/0219549 A1* | 8/2014 | Choi | G06T 7/593 | 382/154 |
| 2014/0254517 A1* | 9/2014 | Nam | H04B 7/0417 | 370/329 |
| 2014/0282799 A1* | 9/2014 | Bae | H04N 21/236 | 725/116 |
| 2014/0307794 A1* | 10/2014 | Park | H04N 19/52 | 375/240.16 |
| 2015/0063452 A1* | 3/2015 | Kim | H04N 19/176 | 375/240.12 |
| 2015/0078442 A1* | 3/2015 | Lim | H04N 19/176 | 375/240.03 |
| 2015/0139372 A1* | 5/2015 | Seo | H04L 25/08 | 375/349 |
| 2015/0280958 A1* | 10/2015 | Yu | H04L 27/364 | 375/222 |
| 2016/0165210 A1* | 6/2016 | Lee | H04N 21/816 | 348/43 |
| 2016/0337091 A1* | 11/2016 | Kim | H04L 47/26 | |
| 2016/0337679 A1* | 11/2016 | Lee | H04N 21/2343 | |
| 2017/0041610 A1* | 2/2017 | Lim | H04N 19/176 | |
| 2017/0047978 A1* | 2/2017 | Kim | H04B 7/0626 | |

FOREIGN PATENT DOCUMENTS

| | | |
|---|---|---|
| KR | 10-2012-0072219 A | 7/2012 |
| WO | WO-2006/127805 A2 | 11/2006 |
| WO | WO-2007/146090 A2 | 12/2007 |

* cited by examiner

METHOD AND DEVICE FOR CALIBRATING IQ IMBALANCE AND DC OFFSET OF RF TRANCEIVER

CROSS-REFERENCE TO RELATED APPLICATION

The present application claims priority to Korean patent application number 10-2016-0025738 filed on Mar. 3, 2016 and Korean patent application number 10-2016-0096630 filed on Jul. 29, 2016, the entire disclosure of which is incorporated herein in its entirety by reference.

BACKGROUND

1. Field of Invention

Various embodiments of the inventive concept of the present disclosure relate to a method and a device for calibrating an IQ imbalance and a DC offset of an RF transceiver.

2. Description of Related Art

Radio frequency (RF) receivers and transmitters generate inphase and quadrature phase (I-Q) analogue signals. These signals usually have distortions that restrict the performance of a demodulator or a modulator.

These distortions referred to as orthogonal errors are caused by imbalances of gains and phases between I-Q signal components. The imbalance of I-Q signals may induce image frequencies (transceiving) and direct current (DC) offset (receiving) and fc frequency components (transmitting) that interface a demodulation or modulation process. Therefore, it is necessary to calibrate such I-Q imbalances.

SUMMARY

A purpose of the present disclosure is to estimate a DC offset and an I-Q imbalance component of a transceiver by sub-sampling a transmitting signal during conversion into a base band, and to pre-calibrate a transmitting signal being input into the transmitter to input a signal from which a DC offset and an I-Q imbalance have been removed.

According to an embodiment of the present disclosure, there is provided a method for calibrating a DC offset and an I-Q imbalance component of an RF transceiver, the method including inputting a test signal into a transmitter, and converting the test signal into an analogue test signal; converting the analogue test signal using a transmitting mixer; sub-sampling a signal output from the transmitting mixer, and digitalizing the sub-sampled signal; and computing a DC offset calibrating constant number and an I-Q imbalance calibrating constant number from the sub-sampled signal.

According to the present disclosure, it is possible to remove a transmitting or receiving DC offset and an I-Q imbalance component even without a squarer or a base band pass filter.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
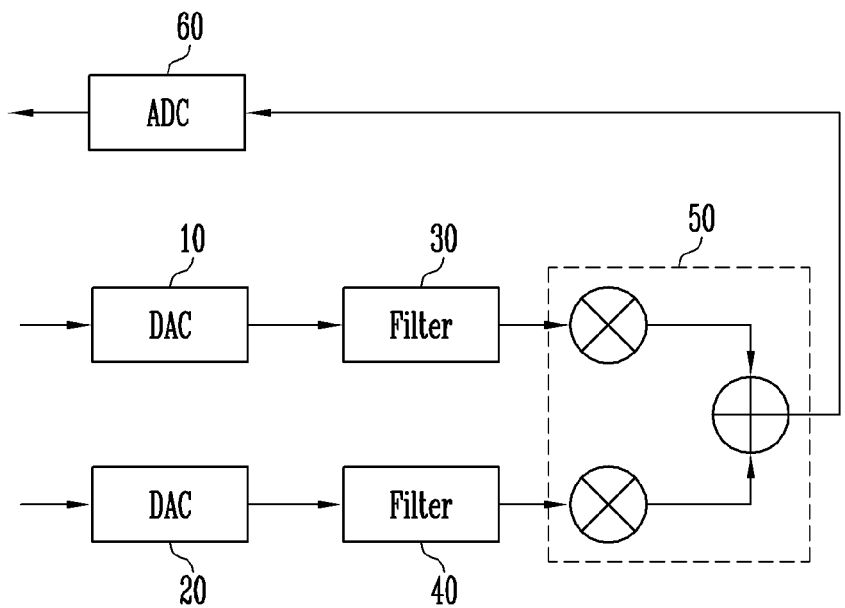
FIG. 1 is a block diagram schematically illustrating a portion of a configuration of an RF (Radio Frequency) transceiver according to an embodiment of the present disclosure.

Specific structural or functional descriptions of exemplary embodiments in accordance with a concept of the present invention which are disclosed in this specification are illustrated only to describe the exemplary embodiments in accordance with the concept of the present invention and the exemplary embodiments in accordance with the concept of the present invention may be carried out by various forms but the present invention is not limited to the exemplary embodiments described in this specification.

Various modifications and changes may be applied to the exemplary embodiments in accordance with the concept of the present invention so that the exemplary embodiments will be illustrated in the drawings and described in detail in the specification. However, the exemplary embodiments according to the concept of the present invention is not limited to the specific embodiments, but includes all changes, equivalents, or alternatives which are included in the spirit and technical scope of the present invention.

Terminologies such as first or second may be used to describe various components but the components are not limited by the above terminologies. The above terminologies are used to distinguish one component from the other component, for example, a first component may be referred to as a second component without departing from a scope in accordance with the concept of the present invention and similarly, a second component may be referred to as a first component.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween. Other expressions which describe the relationship between components, that is, "between" and "directly between", or "adjacent to" and "directly adjacent to" need to be interpreted by the same manner.

Terminologies used in the present specification are used only to describe specific exemplary embodiments, and are not intended to limit the present invention. A singular form may include a plural form if there is no clearly opposite meaning in the context. In the present specification, it should be understood that terms "include" or "have" indicate that a feature, a number, a step, an operation, a component, a part or the combination those of described in the specification is present, but do not exclude a possibility of presence or addition of one or more other features, numbers, steps, operations, components, parts or combinations thereof, in advance.

If it is not contrarily defined, all terms used herein including technological or scientific terms have the same meaning as those generally understood by a person with ordinary skill in the art. Terminologies which are defined in a generally used dictionary should be interpreted to have the same meaning as the meaning in the context of the related art but are not interpreted as an ideally or excessively formal meaning if they are not clearly defined in this specification.

In general, a transmitting DC offset and a transmitting I-Q imbalance may occur as a bias voltage of an analogue device on a transmitting signal path is included in the signal. The DC offset may be multiplied by a local oscillator (LO) signal, and be included in a transmitting signal as a carrier frequency component.

Otherwise, an I-Q imbalance may occur due to a imbalance between a gain and a delay occurring on an I and Q signal path, or due to a imbalance between a gain and a phase of an I-Q LO signal of a transmitting mixer.

Since a carrier frequency signal is included in a distorted transmitting signal as aforementioned, the electrical power of the signal may be distorted, and/or an image frequency of the transmitting signal may be generated, thereby damaging the signal.

Therefore, in order to calibrate the distortion of the transmitting signal, it is necessary to measure the carrier frequency signal included in the output signal of the transmitting mixer and the I-Q gain and phase imbalance signal.

As a conventional method for measuring the I-Q imbalance and DC offset caused by the transmitter mixer, there was a method of forming an envelope signal in order to input an output signal of the transmitting mixer into the RF receiver as an input signal, or to remove the carrier frequency value included in the transmitting signal.

In the case of inputting the output signal of the transmitter mixer into the RF receiver as an input signal, since the I-Q imbalance and DC offset generated in the receiver are added to the I-Q imbalance and DC offset generated in the transmitter, in order to measure the exact I-Q imbalance and DC offset generated in the transmitter, it is necessary to measure and calibrate the I-Q imbalance and DC offset of the receiver beforehand.

In the case of forming an envelope signal, a squarer and a base band filter are necessary for envelope signal conversion, and thus, an additional circuit is necessary as well. Hence, in conventional methods, a transmitting mixer output signal would be received using an I or Q branch, or the output signal of the transmitting mixer would be directly connected to an analogue-digital convertor to be converted into a digital signal, so that the I-Q imbalance and DC offset included in the converted digital signal could be estimated and then removed.

According to the method of the present disclosure, an envelope signal conversion is not made, and thus a squarer and base band pass filter are not necessary, and a signal output from the transmitter is a signal of which the I-Q imbalance has been calibrated, and thus this signal may be used as the signal for the receiver IQ calibration.

Explanation on the RF transceiver according to the present disclosure will be made in more detail hereinafter.

FIG. 1 is a block diagram schematically illustrating a portion of a configuration of the radio frequency (RF) according to an embodiment of the present disclosure.

In the present disclosure, since envelope signal conversion is not made, a squarer and a base band pass filter are not necessary, and since the signal output from the transmitter is an I-Q imbalance calibrated signal, this signal may be used as the signal for receiver IQ calibration.

Explanation on the RF transceiver according to the present disclosure will be made in detail hereinafter.

FIG. 1 is a block diagram schematically illustrating a portion of a configuration of a radio frequency (RF) transmitter according to an embodiment of the present disclosure.

Referring to FIG. 1, the RF transceiver according to the present disclosure may be configured to include a digital-analogue converter 10, 20, a filter 30, 40, a transmitting mixer 50, and an analogue-digital converter 60.

The transmitting mixer 50 may be configured to include a plurality of multipliers and adders.

First of all, the transmitting I-Q signal is input into each digital-analogue converter 10, 20, respectively, and a transmitting I-Q analogue signal is output by the digital-analogue converter 10, 20.

Each of the transmitting I-Q analogue signal output from the digital-analogue converter 10, 20 is input to the transmitting mixer 50 going through the filter 30, 40, respectively.

Here, the DC offset being input into the transmitting mixer 50 may appear as the carrier frequency component in the output signal of the transmitting mixer 50. Further, as the transmitting I-Q signal goes through each digital-analogue converter 10, 20 and the filter 30, 40, the size and delay value of the I signal and the Q signal may be different from each other, and the size and the phase difference between the I LO signal and the Q LO signal that went through the transmitting mixer 50 may also be different from each other.

That is, the output signal of the transmitting mixer 50 include the effects of the DC off and I-Q imbalance of the transmitter, thereby causing signal distortion.

Such a signal may be input into the analogue-digital converter 60, and be output as a digital signal. Especially, the output signal of the transmitting mixer 50 input into the analogue-digital converter 60 may be sub-sampled and be output as a signal having a low carrier frequency.

Hereinafter, a process of sub-sampling an output signal of the transmitting mixer converted into a digital signal will be explained in detail with reference to FIGS. 2 to 4.

Figure 2:
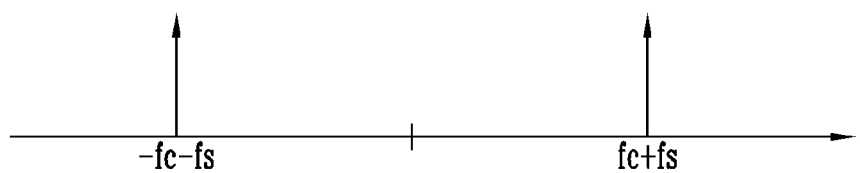
FIGS. 2 to 4 are frequency spectrums provided to explain an output signal of a transmitting mixer converted into a digital signal being sub-sampled.
Figure 3:
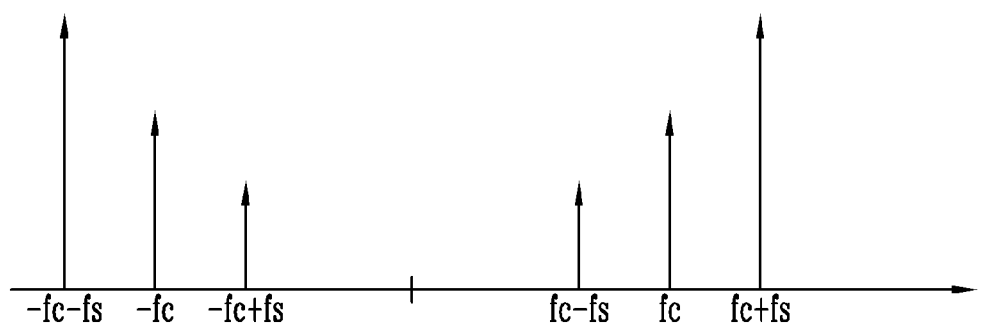
Figure 4:
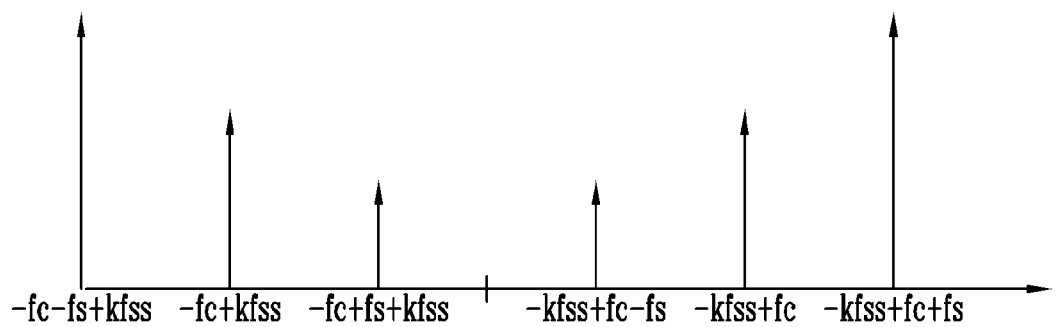

FIGS. 2 to 4 are frequency spectrums provided to explain an example of sub-sampling an output signal of a transmitting mixer converted into a digital signal according to an embodiment of the present disclosure.

In the case of multiplying a test demodulation frequency fs signal having a unit value with a carrier demodulation frequency fc signal to output only a real number component, a spectrum such as in FIG. 2 may be displayed. This is provided to explain an example of a signal having no DC offset and I-Q imbalance, and referring to FIG. 2, one can seen that a spectrum having an identical height is displayed on each of −fs−fc frequency and fc+fs frequency.

Unlike the aforementioned, FIG. 3 is provided to explain an example of a signal where the DC offset and I-Q imbalance exist, and referring to FIG. 3, and a spectrum is displayed on not only −fs−fc frequency and fc+fs frequency due to the effect of the I-Q imbalance but also on fs−fc frequency and −fs+fc frequency (image frequency signal).

Further, due to the effect of the DC offset, a spectrum may be displayed on −fc frequency and fc frequency (carrier signal) as well.

When the output signal of the transmitting mixer 50 illustrated in FIG. 1 has a spectrum as illustrated in FIG. 3, it is sub-sampled via the analogue-digital converter 40, and may thus be converted into a digital signal having a spectrum as illustrated in FIG. 4.

More specifically, based on an assumption that the test signal frequency is defined as if, the carrier frequency is defined as fc, and the sub-sampling frequency is defined as fss as aforementioned, the test signal frequency fs, the carrier frequency fc and the sub-sampling frequency fss may satisfy relations such as equation 1-1 to equation 1-3 shown below.

$$kf_{ss} \leq f_c \leq (k+1)f_{ss} \quad \text{[Equation 1]}$$

$$(k+\tfrac{1}{2})f_{ss} \geq f_c \quad \text{[Equation 1-2]}$$

$$\tfrac{1}{2}f_{ss} \geq f_c - kf_{ss} + f_s \quad \text{[Equation 1-3]}$$

That is, the carrier frequency fc may be set to be k·fss or above and (k+1)·fss or below as in [Equation 1-1], and to be k·fss or above and (k+½)·fss or below as in [Equation 1-1] and [Equation 1-2]. (k being any natural number).

Next, when the test signal frequency fs is selected such that (fc−k·fss+fs) is (½)·fss or below as in [Equation 1-3], the frequency spectrum of the sub-sampled signal may be as illustrated in FIG. 4.

Referring to FIG. 4, the frequency signal having a positive value may be moved by as much as −k·fss compared to the spectrum illustrated in FIG. 3 and then displayed, and the frequency signal having a negative value may be moved by as much as k·fss compared to the spectrum illustrated in FIG. 3, and then shown.

That is, the output signal of the transmitting mixer 50 that went through the sub-sampling may be converted into a digital signal having a small frequency, and be output from the analogue-digital converter 60, and the output signal output from the analogue-digital converter 60 may be analyzed to measure the DC offset and the I-Q imbalance.

Figure 5:
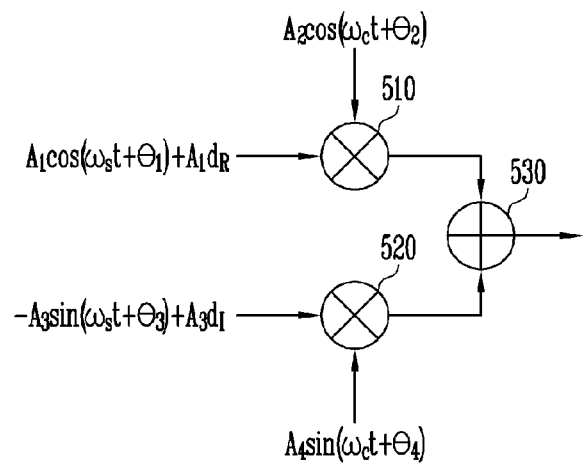
FIG. 5 is a view illustrating a transmitting mixer, and a signal being input into and being output from the transmitting mixer according to an embodiment of the present disclosure.

FIG. 5 is a view illustrating the transmitting mixer, and a signal to be input into and output from the transmitting mixer according to an embodiment of the present disclosure.

Referring to FIG. 5, in the multiplier 510, signals $\{A_1 \cos(\omega_s t+\theta_1)+A_1 d_R\}$ and $A_2 \cos(\omega_c t+\theta_2)$ may be multiplied, and in the multiplier 520, signals $\{-A_3 \sin(\omega_s t+\theta_3)+A_3 d_I\}$ and $A_4 \sin(\omega_c t+\theta_4)$ may be multiplied.

The signal output from each multiplier may be added by the adder, and the signal output from the adder may be as shown in [Equation 2] below.

$$A_1 \cos(\omega_s t+\theta_1)A_2 \cos(\omega_c t+\theta_2)+d_R A_1 A_2 \cos(\omega_c t+\theta_2)-A_3 \sin(\omega_s t+\theta_3)A_4 \sin(\omega_c t+\theta_4)+d_I A_3 A_4 \sin(\omega_c t+\theta_4) \quad \text{[Equation 2]}$$

($A_1$ to $A_4$, $d_R$ and $d_I$ being any constant numbers)

Next, when the output signal of the transmitting mixer expressed as in [Equation 2] is sub-sampled, the sub-sampled output signal may be as in [Equation 3] shown below.

$$A_1 A_2 \cos(\omega_s t+\theta_1) \cos(\omega_c t-k\omega_{ss}t+\theta_2)+d_R A_1 A_2 \cos(\omega_c t-k\omega_{ss}t+\theta_2)-A_3 A_4 \sin(\omega_s t+\theta_3) \sin(\omega_c t-k\omega_{ss}t+\theta_4)+d_I A_3 A_4 \sin(\omega_c t-k\omega_{ss}t+\theta_4) \quad \text{[Equation 3]}$$

According to the present disclosure, it is possible to compute the DE offset and I-Q imbalance component from the signal output from the transmitting mixer using the aforementioned [Equation 3].

That is, the DC offset component may be computed with reference to the section having the $(\omega_c - k\omega_{ss})$ component, and the I-Q imbalance component may be computed with reference to the section having $(\omega_s)$ component.

More specifically, $d_R$, $d_I$ may be obtained using $d_R A_1 A_2 \cos\theta_2$, $d_R A_1 A_2 \sin\theta_2$, $d_I A_3 A_4 \cos\theta_4$, and $d_I A_3 A_4 \sin\theta_4$.

Further, the I-Q imbalance component may be calibrated with reference to $A_1 A_2 \cos(\theta_1+\theta_2)$, $A_1 A_2 \sin(\theta_1+\theta_2)$, $A_3 A_4 \cos(\theta_3+\theta_4)$, and $A_3 A_4 \sin(\theta_3+\theta_4)$.

Figure 6:
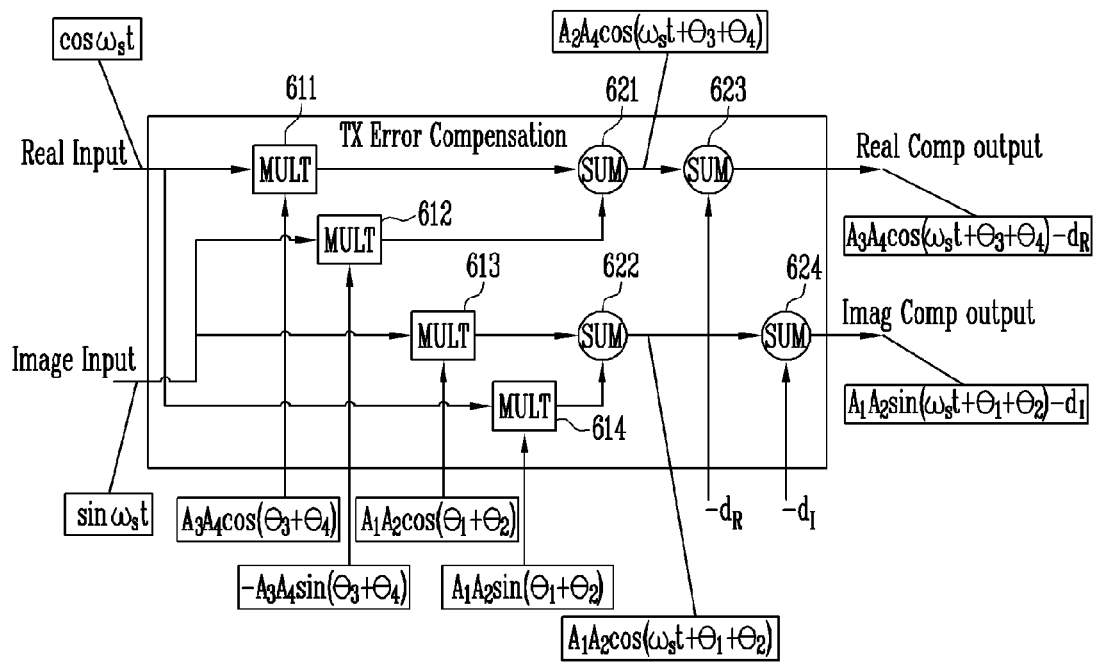
FIG. 6 is a view illustrating a configuration of an interior of a transmitting signal error compensator according to an embodiment of the present disclosure.

FIG. 6 is a view illustrating a configuration of an interior of a transmitting signal error compensator according to an embodiment of the present disclosure.

Referring to FIG. 6, the transmitting signal error compensator according to the present disclosure may be configured to include a plurality of multipliers 611 to 614 and a plurality of adders 621 to 624.

It is possible to input a test signal into the transmitting signal error compensator, and input the previously obtained DC offset and I-Q imbalance calibrating signal to each of the multipliers 611 to 614 and the adders 621 to 624 and have the signal of which the DC offset and I-Q imbalance have been calibrated to be output.

More specifically, test signals $\cos \omega_s t$ and $\sin \omega_s t$ are each input into a real input and an image input, and in order to calibrate the I-Q imbalance, a multiplication of $\cos \omega_s t$ and $A_3 A_4 \cos(\theta_3+\theta_4)$ may be output from the multiplier 612, a multiplication of $\sin \omega_s t$ and $-A_3 A_4 \sin(\theta_3+\theta_4)$ may be output from the multiplier 613, and a multiplication of $\cos \omega_s t$ and $A_1 A_2 \sin(\theta_1+\theta_2)$ may be output from the multiplier 614.

Next, the adder 621 adds the signals output from the multiplier 611, 612, and the adder 622 adds the signals output from the multiplier 613, 614. Therefore, the adder 621 outputs $A_3 A_4 \cos(\omega_s t+\theta_3+\theta_4)$, and the adder 622 outputs $A_1 A_2 \sin(\omega_s t+\theta_1+\theta_2)$.

Next, in order to calibrate the DC offset, the adder 623 adds $-d_R$ to the output signal of the adder 621, and the adder 624 adds $-d_I$ to the output signal of the adder 622. Accordingly, the real output signal of the transmitting signal error compensator may be as in [Equation 4-1] below, and the image output signal of the transmitting signal error compensator may be as in [Equation 4-2] below.

$$A_3 A_4 \cos(\omega_s t+\theta_3+\theta_4)-d_R \quad \text{[Equation 4-1]}$$

$$A_1 A_2 \sin(\omega_s t+\theta_1+\theta_2)-d_I \quad \text{[Equation 4-2]}$$

When the calibrated signal is input into the transceiver according to the present disclosure, the output signal of the transmitting mixer may be as in [Equation 5] shown below.

$$A_1A_2A_3A_4 \cos(\omega_s t+\theta_1+\theta_3) \cos(\omega_c t) \cos(\theta_2-\theta_4)+$$
$$A_1A_2A_3A_4 \sin(\omega_s t+\theta_1+\theta_3) \cos(\omega_c t) \cos(\theta_2-\theta_4) \quad \text{[Equation 5]}$$

That is, one can see that the DC offset and I-Q imbalance have been calibrated.

Hereinafter, a method for calibrating the DC offset and I-Q imbalance of a receiving signal will be explained with reference to FIG. 7.

Figure 7:
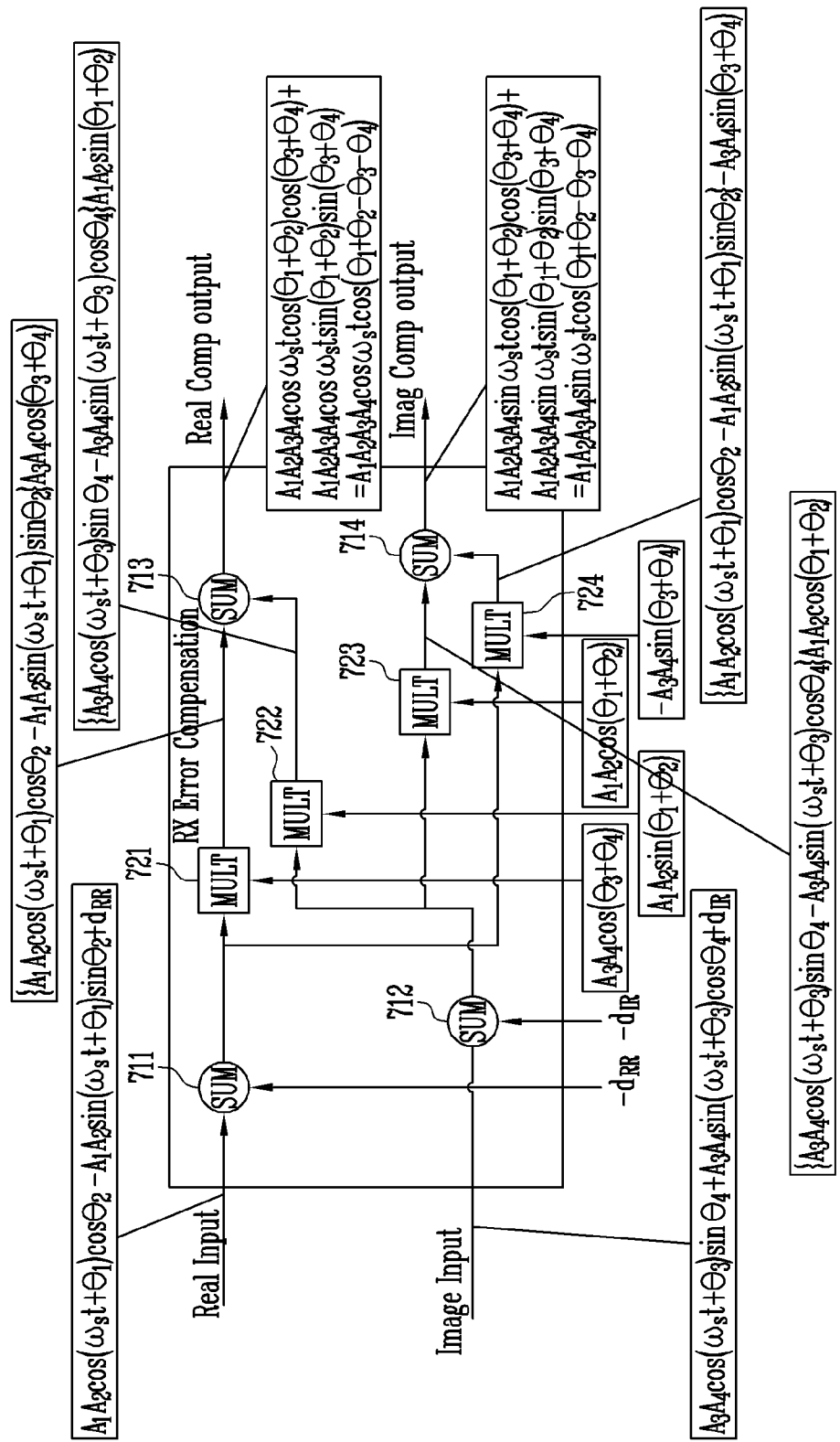
FIG. 7 is a view illustrating a configuration of a receiving signal error compensator according to an embodiment of the present disclosure.

FIG. 7 is a view illustrating a configuration of an interior of a receiving signal error compensator according to an embodiment of the present disclosure.

Referring to FIG. 7, the receiving signal error compensator according to the present disclosure may be configured to include a plurality of adders 711 to 714 and adders 721 to 724.

When the signal from which the DC offset and I-Q imbalance component have been removed is input according to the aforementioned method, only the receiving DC offset and I-Q imbalance component generated as passing the receiving path is output from the receiver. Such an output signal of the receiver may be digitalized so that the DC offset and I-Q imbalance component included in the receiving signal may be computed. The method for computing the DC offset and I-Q imbalance component from the digital signal may be identical to the method for computing the DC offset and I-Q imbalance component of the transmitting signal.

When the DC offset computed from the receiving signal is $d_{RR}$, $d_{IR}$, and the I-Q imbalance component is $A_1A_2 \cos(\theta_1+\theta_2)$, $A_1A_2 \sin(\theta_1+\theta_2)$, $A_3A_4 \cos(\theta_3+\theta_4)$, $A_3A_4 \sin(\theta_3+\theta_4)$ the DC off and I-Q imbalance component may each of input into each of the adders 711, 712, and into each of the multipliers 721 to 724, respectively.

That is, as illustrated in FIG. 7, when the signal including the DC offset and I-Q imbalance component are input into the receiving signal error compensator, and the aforementioned DC offset and I-Q imbalance compensation constant number is input into each of the adders 711, 712 and the multipliers 721 to 724, the signal from which the DC offset and I-Q imbalance component have been removed may be obtained.

Figure 8:
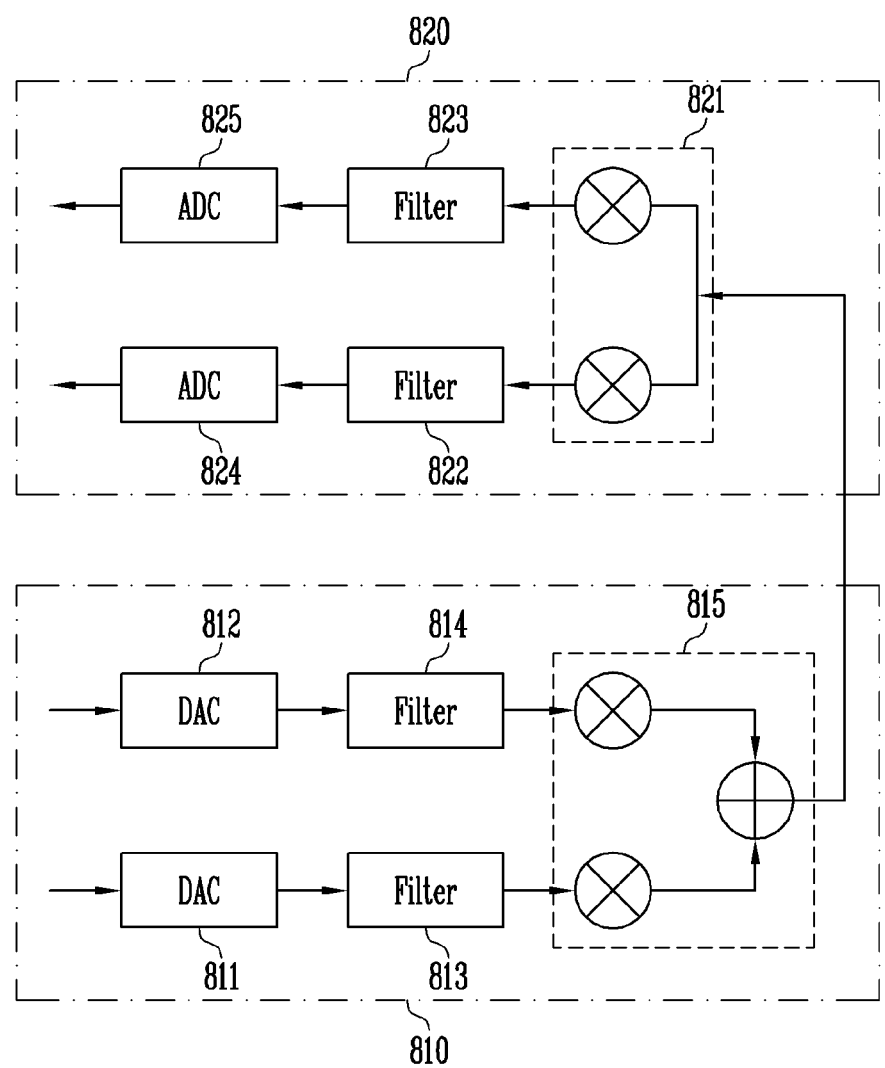
FIG. 8 is a view illustrating a configuration of a transmitter and a receiver according to an embodiment of the present disclosure.

Next, FIG. 8 is a view illustrating a configuration of an interior of the transmitter and the receiver according to an embodiment of the present disclosure.

The transmitter 810 may be configured to include a plurality of digital-analogue converters 811, 812, a plurality of transmitting filters 813, 814 and a transmitting mixer 815, and the receiver 820 may be configured to include a receiving mixer 821, a plurality of receiving filters 822, 823, and a plurality of analogue-digital converters 824, 825.

First of all, when the DC offset and I-Q imbalance component are estimated as aforementioned, and a calibrated transmitting signal is input into the transmitter 810, the calibrated transmitting signal may go through the digital-analogue converter 811, 812, transmitting filter 813, 814, transmitting mixer 815, and a signal from which the DC offset and I-Q imbalance component have been removed may be output.

The transmitting signal from which the DC offset and I-Q imbalance component have been removed is input into the receiver 820, and as it goes through the receiving mixer 821, the receiving filter 822, 823, and the analogue-digital converter 824, 825, it is output from the receiver 820 including the DC offset and I-Q imbalance component.

Referring to such a signal being output from the receiver 820, the DC offset and I-Q imbalance component being generated as is goes through the receiving path may be computed, and calibrated.

That is, in the present disclosure, since the DC offset and I-Q imbalance component by the transmitter 810 are not included in the signal being input into the receiver 820, it is possible to compute the exact DC offset and I-Q imbalance component by the receiver and calibrate the same.

Figure 9:
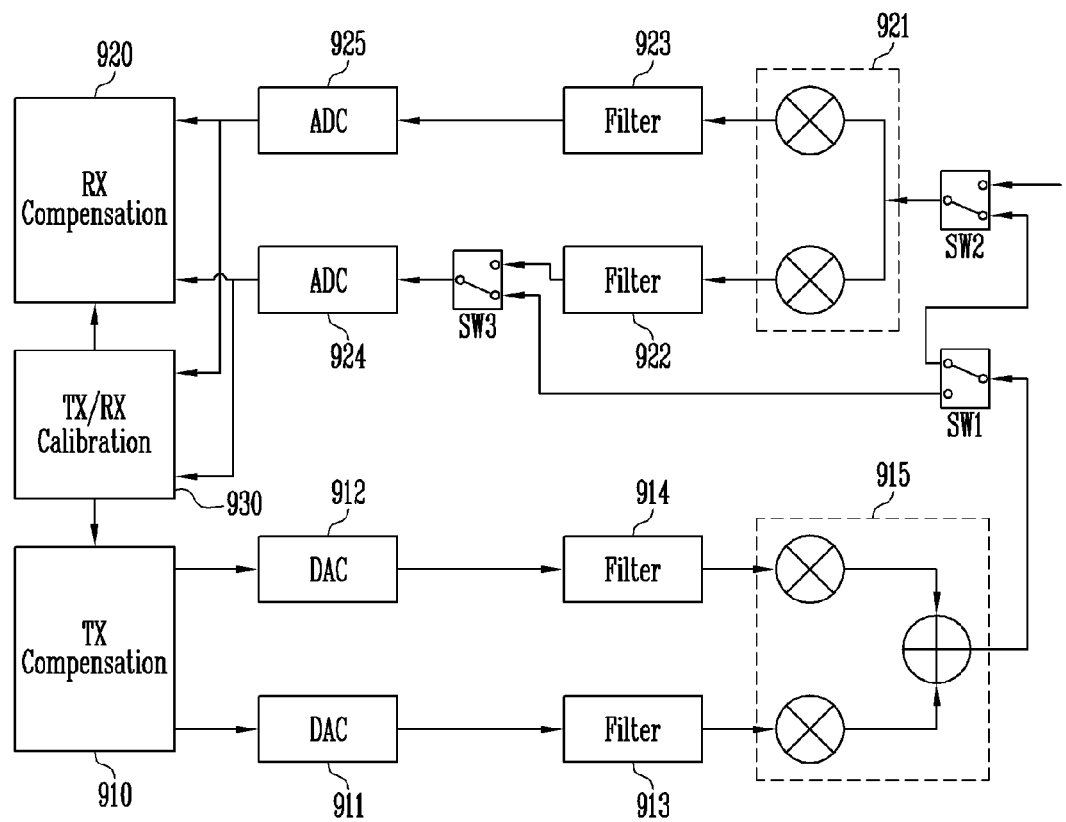
FIG. 9 is a view schematically illustrating an RF transceiver according to another embodiment of the present disclosure.

FIG. 9 is a view schematically illustrating a configuration of an interior of the RF transceiver according to another embodiment of the present disclosure.

The RF transceiver according to the present disclosure may be configured to include a transmitting signal compensator 910, a receiving signal compensator 920, a transceiving signal error estimator 930, transmitter, receiver, and a plurality of switches SW1 to SW3.

First of all, when a signal is input into the transmitter with the first switch SW1 and the third switch SW3 set to be connected to a number 1 terminal, the signal to which the DC offset and I-Q imbalance component generated while passing the transmitting path is input into the transceiving signal error compensator 930.

The transceiving signal error estimator 930 computes the DC offset and I-Q imbalance component using the aforementioned method, and in the receiving signal compensator 910, the transmitting signal may be calibrated with reference to the DC offset and I-Q imbalance component computed in the transceiving signal error estimator 930.

Next, when the transmitting signal calibrated by the transmitting signal compensator 910 is output to the transmitter with the first switch SW1 and the third switch SW3 set to be connected to number 0 terminal, a transmitting signal from which the DC offset and I-Q imbalance component have been removed may be input into the receiver.

The DC offset and I-Q imbalance component may be included in the signal being input into the receiver as it passes the receiving mixer 921, receiving filters 922, 923, and analogue-digital converter 924, 925. Such DC offset and I-Q imbalance component may be computed in the transceiving signal error estimator 930, and the DC offset and I-Q imbalance component computed in the transceiving signal error estimator 930 may be compensated in the receiving signal compensator 920.

Figure 10:
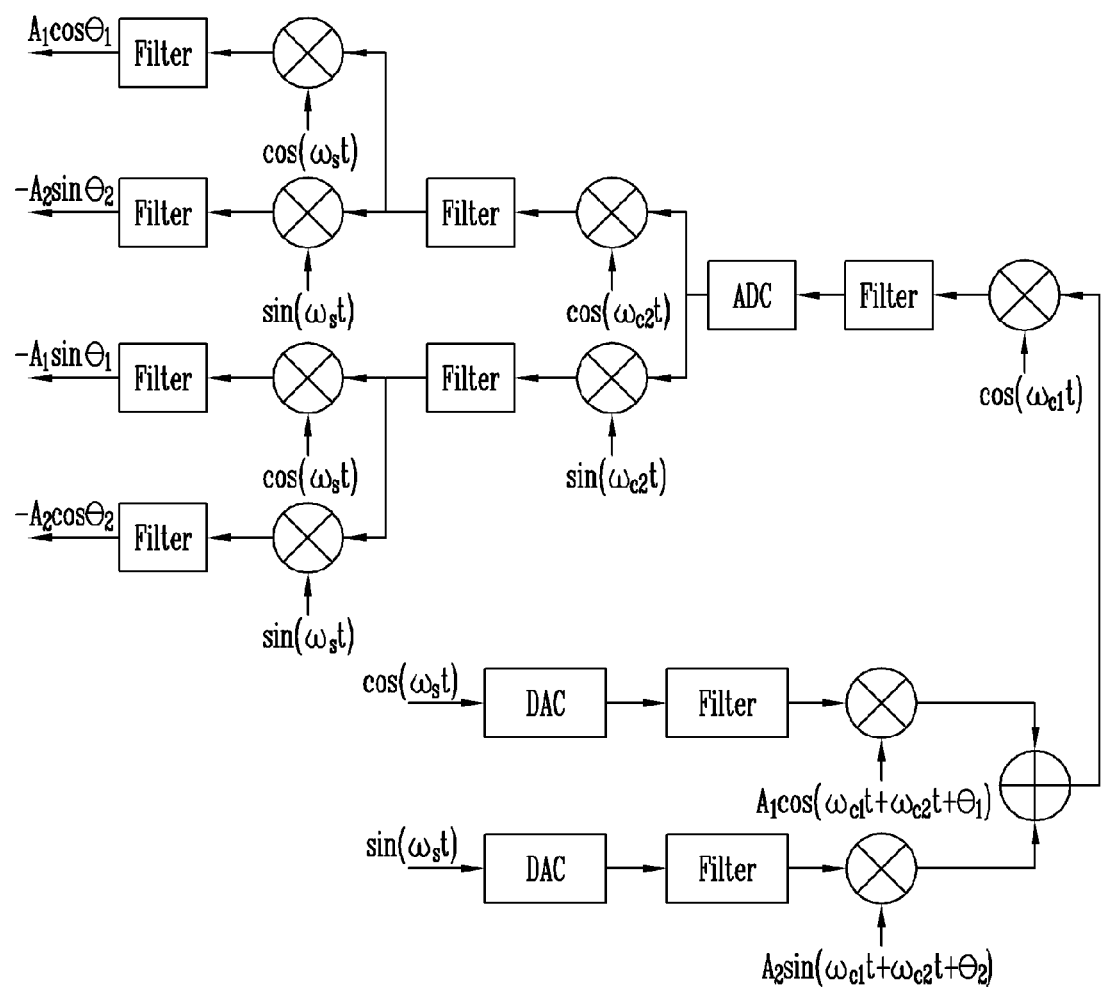
FIG. 10 is provided for calibrating a transmitting DC offset and an I-Q imbalance component of a transmitter, that is, a view schematically illustrating a portion of a configuration of the RF transceiver according to the another embodiment of the present disclosure.

FIG. 10 is provided for calibrating a transmitting DC offset and an I-Q imbalance component of a transmitter, that is, a view schematically illustrating a portion of a configuration of the RF transceiver according to the another embodiment of the present disclosure.

In the case of using the RF transceiver as illustrated in FIG. 10, in order to calibrate the transmitting signal where the DC offset and I-Q imbalance component are included, a single branch of the receiver may be used, and more specifically, the transmitting signal including the DC offset and I-Q imbalance component may be input into the real branch of the receiver.

First, $\cos \omega_{c1} t$ is multiplied to the output signal of the transmitter, and then $\omega_{c1}$ component is removed using the filter.

Next, the signal from which the $\omega_{c1}$ component has been removed is digitalized, the digitalized signal is separated into a real number and an image number, that is, $\cos \omega_{c2} t$ and $\sin \omega_{c2} t$ are multiplied to the digitalized signal, respectively, and then the $\omega_{c2}$ component remaining in the digitalized signal is removed using the filter. Next, the DC offset signal remaining in the real number and image number signal from which the $\omega_{c2}$ has been removed is separated and calibrated, and the $\omega_s$ component is removed from the real number and image number signal from which the $\omega_{c2}$ component has been removed. That is, each of the cos $\omega_s$t and sin $\omega_s$t may be multiplied to the real number signal, and each of the cos $\omega_s$t and sin $\omega_s$t may be multiplied to each of the image number signal, and then the $\omega_s$ may be removed using the filter. According to such a process, $A_1 \cos \theta_1$, $A_1 \sin \theta_1$, $A_2 \cos \theta_2$, $A_2 \sin \theta_2$ components may be finally obtained, which may be used as calibrating signals.

Figure 11:
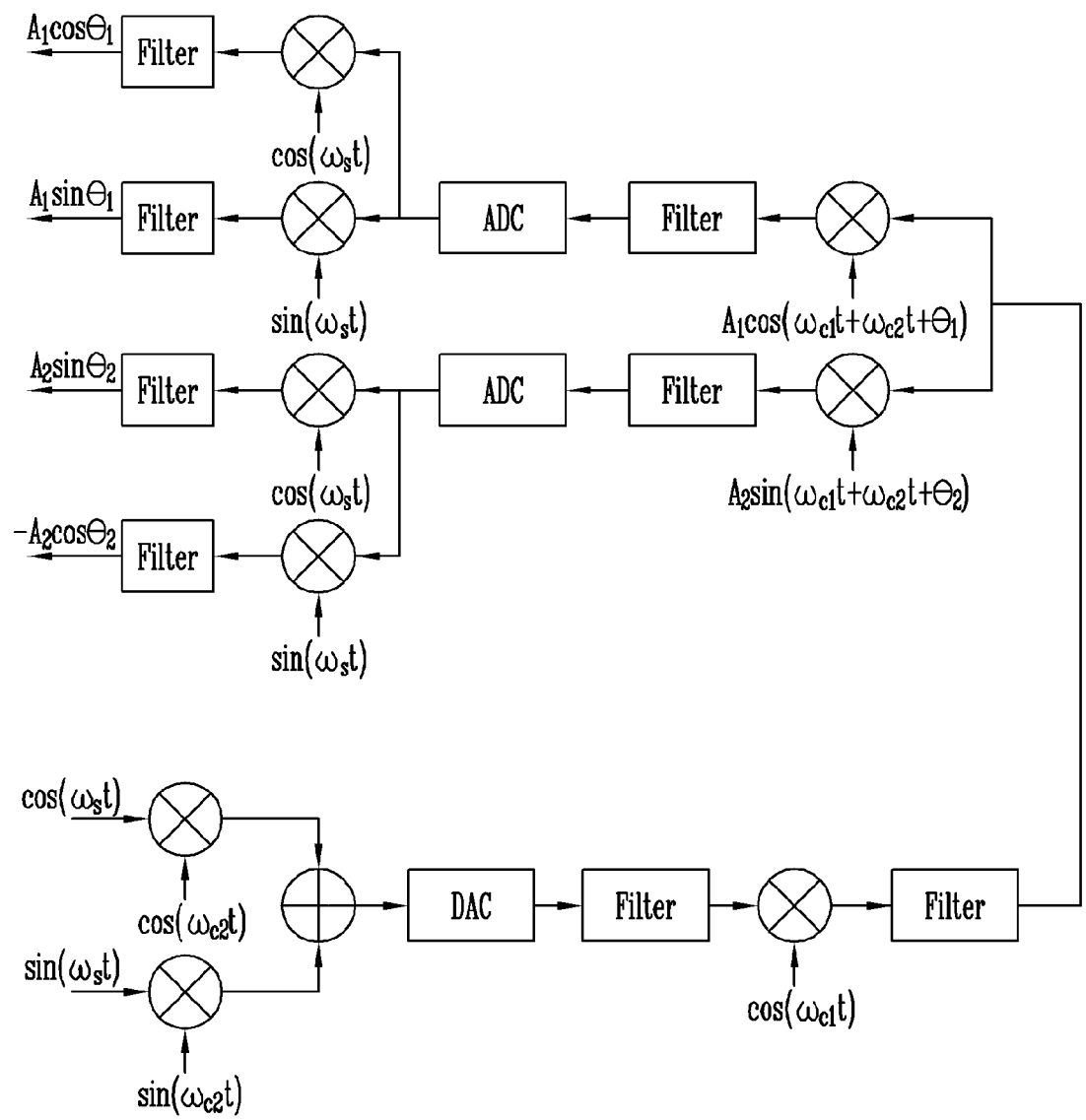
FIG. 11 is provided for calibrating a receiving DC offset and an I-Q imbalance component of a receiver, that is, a view schematically illustrating a portion of a configuration of the RF transceiver according to the another embodiment of the present disclosure.

FIG. 11 is provided for calibrating a receiving DC offset and an I-Q imbalance component of a receiver, that is, a view schematically illustrating a portion of a configuration of the RF transceiver according to the another embodiment of the present disclosure.

In order to calibrate the DC offset and I-Q imbalance component of the receiver, a transmitting signal may be created using a signal calibrated in the transmitter or using a single branch of the transmitter.

More specifically, referring to FIG. 11, a $\omega_{C2}$ carrier signal is multiplied to a real or image branch input signal of the transmitter to create a cosine signal and a sine signal. Next, the signal carried on the $\omega_{C2}$ carrier may be converted into an analogue signal to create a transmitting signal to which the $\omega_{C1}$ carrier has been multiplied. Here, the transmitting signal as a form of a symmetrical spectrum signal, and thus this symmetric spectrum signal may be filtered by the transmitting filter.

Next, by multiplying $(\omega_{C1}+\omega_{C2})$ component, that is $A_1 \cos (\omega_{C1}t+\omega_{C2}t+\theta_1)$ and $A_2 \sin (\omega_{C1}t+\omega_{C2}t+\theta_2)$, the high frequency signal of $2(\omega_{C1}+\omega_{C2})$ component is removed by using the filter, and is then separated into a real number and image number signal.

The separated signal is digitalized, and then the DC component is extracted therefrom to be used as the DC offset calibrating constant number. $A_1 \cos \theta_1$, $A_1 \sin \theta_1$, $A_2 \cos \theta_2$, $A_2 \sin \theta_2$ components included in the real number and image number signal are separated so that they may be used as the calibrating signals of the receiving signal.

Figure 12:
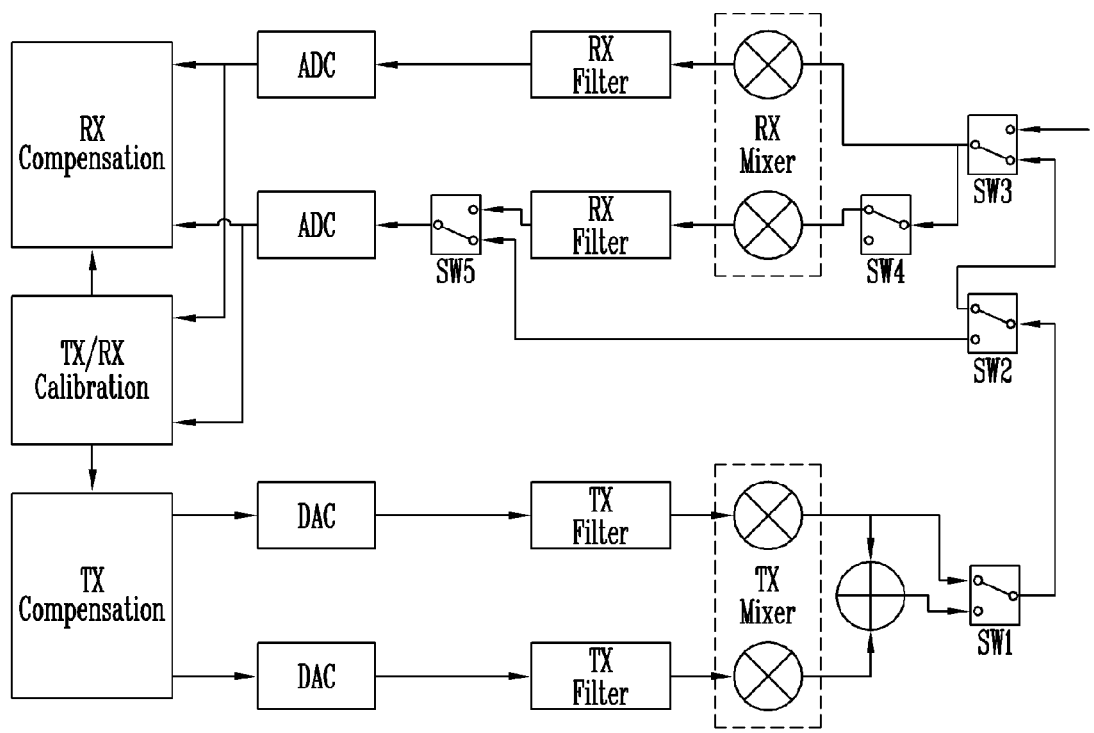
FIG. 12 is a view schematically illustrating a configuration of an interior of an RF transceiver to which a sub-sampling method and a single branch method are all applicable.

FIG. 12 is a view schematically illustrating a configuration of an interior of an RF transceiver to which a sub-sampling method and a single branch method are all applicable.

In order to compensate the DC offset and I-Q imbalance component of the transmitting signal using the aforementioned sub-sampling method, it is possible to control the first switch SW1, the second switch SW2, and the fifth switch SW5 to access the number 1 terminal, and then drive the RF transceiver.

When using the receiver single branch method unlike the aforementioned, the first switch SW1, the third switch SW3 and the fourth switch SW4 may be controlled to access the number 1 terminal, and the second switch SW2 and the fifth switch SW5 may be controlled to access the number 0 terminal, and then the signal of the transmitter to be calibrated may be input into the single branch of the receiver.

Lastly, in the case of calibrating the DC offset and I-Q imbalance component of the receiver using the single branch of the transmitter, the first switch SW1, the second switch SW3, the fourth switch SW4 and the fifth switch SW5 may be controlled to access the number 0 terminal and the third switch SW3 may be controlled to access the number 1 terminal, and then the RF transceiver may be driven.

Meanwhile, the present specification is based on an assumption that the terminal arranged on a lower end of each switch is the number 0 terminal, and the terminal arranged on an upper end of each switch is the number 1 terminal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skilled in the art that various changes in form and details may be made without departing from the spirit and scope of the present disclosure as set forth in the following claims.

What is claimed is:

1. A method for calibrating a DC offset and an I-Q imbalance component of an RF transceiver, the method comprising:

inputting a test signal into a transmitter, and converting the test signal into an analogue test signal;

converting the analogue test signal using a transmitting mixer;

sub-sampling a signal output from the transmitting mixer; and computing a DC offset calibrating constant number and an I-Q imbalance calibrating constant number from a sub-sampled signal, wherein a frequency fs of the test signal, a carrier frequency fc and a sub-sampling frequency fss satisfy the following equations [1-1] to [1-3], $$kf_{ss} \leq f_c \leq (k+1)f_{ss} \quad [1\text{-}1]$$

$$(k+\tfrac{1}{2})f_{ss} \geq f_c \quad [1\text{-}2] \text{ and}$$

$$\tfrac{1}{2}f_{ss} \geq f_c - kf_{ss} + f_s \quad [1\text{-}3],$$

where k is a constant number.

2. The method according to claim 1, wherein when an output signal of the transmitting mix where the DC offset and I-Q imbalance component are included is based on the following equation 2:

$$A_1 \cos (\omega_c t+\theta_1)A_2 \cos (\omega_c t+\theta_2)+d_R A_1 A_2 \cos (\omega_c t+\theta_2)-A_3 \sin (\omega_c t+\theta_3)A_4 \sin (\omega_c t+\theta_4)+d_I A_3 A_4 \sin (\omega_c t+\theta_4) \quad (2)$$

the sub-sampled signal is based on the following equation 3:

$$A_1 A_2 \cos (\omega_s t+\theta_1) \cos (\omega_c t-k\omega_{ss}t+\theta_2)+d_R A_1 A_2 \cos (\omega_c t-k\omega_{ss}t+\theta_2)-A_3 A_4 \sin (\omega_s t+\theta_3) \sin (\omega_c t-k\omega_{ss}t+\theta_4)+d_I A_3 A_4 \sin (\omega_c t-k\omega_{ss}t+\theta_4) \quad (3)$$

where $A_1$ to $A_4$, $d_R$ and $d_I$ being constant numbers.

3. The method according to claim 2, wherein the DC offset calibrating constant number is computed from $(\omega_c-k\omega_{ss})$ component of the equation 3, and the I-Q imbalance calibrating constant number is computed from $\omega_s$ component of the equation 3.

4. The method according to claim 3, further comprising inputting into the transmitter a transmitting signal calibrated with reference to the DC offset calibrating constant number and the I-Q imbalance calibrating constant number.

5. The method according to claim 4, further comprising inputting the calibrated transmitting signal into the transmitter, and when a signal from which the DC offset and the I-Q imbalance component have been removed is output from the transmitter, inputting the signal into a receiver.

6. The method according to claim 5,
further comprising computing and calibrating a receiving DC offset and a receiving I-Q imbalance component of an output signal of the receiver generated while going through a receiving path of the receiver.

7. A device for calibrating a DC offset and an I-Q imbalance component of an RF transceiver comprising a transmitter and a receiver, the device comprising:
a transceiving signal error estimator for estimating a transmitting DC offset and a transmitting I-Q imbalance component generated by the transmitter, and for estimating a receiving DC offset and a receiving I-Q imbalance component generated by the receiver;
a transmitting signal compensator for compensating a transmitting signal with reference to the transmitting DC offset and the transmitting I-Q imbalance component estimated in the transceiving signal error estimator; and
a receiving signal compensator for compensating a receiving signal with reference to the receiving DC offset and the receiving I-Q imbalance component estimated in the transceiving signal error estimator,
wherein the transceiving signal error estimator computes the transmitting DC offset and the transmitting I-Q imbalance component from a signal input into the receiver through a single branch of the receiver that bypasses each receiving mixer of the receiver.

8. The device according to claim 7,
wherein the transceiving signal error estimator computes the receiving DC offset and the receiving I-Q imbalance component from an output signal of the receiver when a transmitting signal generated from a single branch of the transmitter is input into the receiver.

9. The device according to claim 7,
wherein the transceiving signal error estimator computes the receiving DC offset and the receiving I-Q imbalance component from an output signal of the receiver when a transmitting signal for which the transmitting DC offset and the transmitting I-Q imbalance component have been compensated is input to the receiver.

10. The device according to claim 9,
wherein the transmitting signal for which the transmitting DC offset and the transmitting I-Q imbalance component have been compensated is obtained by sub-sampling a test signal input into the transmitter.

* * * * *